United States Patent [19]

Brueckmann et al.

[11] Patent Number: 5,539,910
[45] Date of Patent: Jul. 23, 1996

[54] CIRCUIT CONFIGURATION FOR MONITORING THE SUPPLY VOLTAGE OF A PROCESSOR UNIT

[75] Inventors: Dieter Brueckmann, Meerbusch; Johannes van den Boom, Duesseldorf, both of Germany

[73] Assignee: Siemens Aktiengesellschaft, Munich, Germany

[21] Appl. No.: 237,379

[22] Filed: May 3, 1994

[30] Foreign Application Priority Data

May 3, 1993 [DE] Germany ............... 43 14 533.7

[51] Int. Cl.⁶ .................................................. G06F 1/26
[52] U.S. Cl. ...................... 395/750; 395/775; 361/92
[58] Field of Search ........................ 395/750, 550, 395/775, 800; 361/92, 90; 364/483

[56] References Cited

U.S. PATENT DOCUMENTS

| | | | |
|---|---|---|---|
| 3,789,242 | 1/1974 | Cantor ........................... | 327/74 |
| 4,428,020 | 1/1984 | Blanchard et al. ............. | 361/90 |
| 4,551,841 | 11/1985 | Fujita et al. .................... | 371/66 |
| 4,593,180 | 6/1986 | Narita et al. .................... | 219/492 |
| 4,951,171 | 8/1990 | Tran et al. ....................... | 361/90 |
| 5,008,829 | 4/1991 | Cox et al. ........................ | 364/480 |
| 5,019,996 | 5/1991 | Lee .................................. | 364/483 |
| 5,203,000 | 4/1993 | Folkes et al. ................... | 395/750 |
| 5,392,186 | 2/1995 | Alexander et al. ............. | 361/92 |
| 5,430,882 | 7/1995 | Tilghman et al. .............. | 395/750 |

OTHER PUBLICATIONS

Component Data Catalog, 1986, pp. 39–46, General Electric Company.

*Primary Examiner*—Jack B. Harvey
*Assistant Examiner*—Glenn A. Auve
*Attorney, Agent, or Firm*—Herbert L. Lerner; Laurence A. Greenberg

[57] ABSTRACT

A circuit configuration for monitoring a supply voltage of a processor unit being clocked by an oscillator and requiring a minimum supply voltage, includes an undervoltage detector being connected to the processor unit. The undervoltage detector is in operation and generates a reset signal at a supply voltage being in a range between a lower first limit value and a higher second limit value and being below the minimum supply voltage. A comparator is connected to the processor unit. The comparator is in operation at a supply voltage above the second limit value and the comparator generates an activation signal at a supply voltage above a third limit value being above the minimum supply voltage. The oscillator is in operation at a supply voltage above the second limit value and the processor unit is in operation upon the appearance of the activation signal.

11 Claims, 1 Drawing Sheet

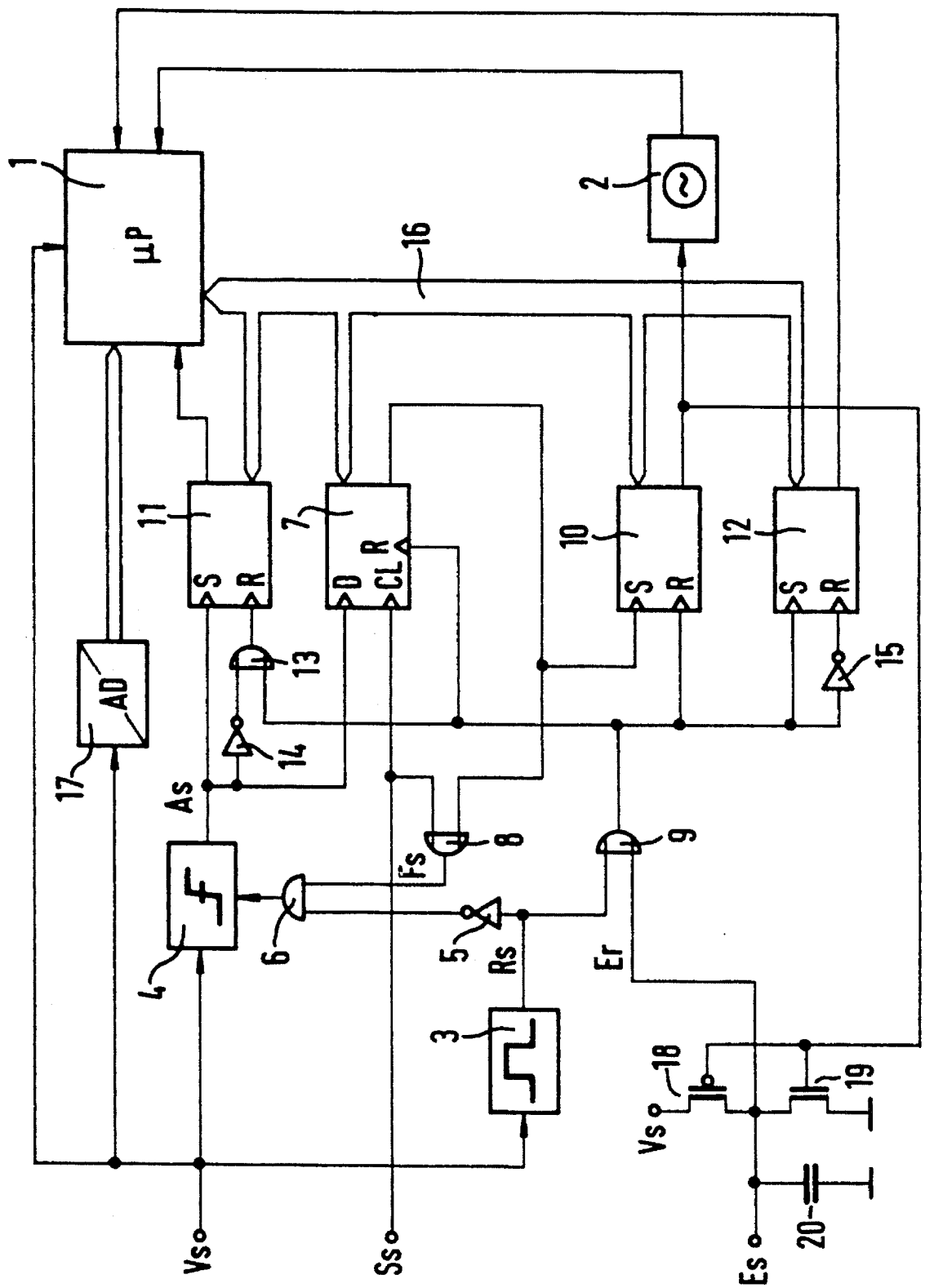

CIRCUIT CONFIGURATION FOR MONITORING THE SUPPLY VOLTAGE OF A PROCESSOR UNIT

BACKGROUND OF THE INVENTION

Field of the Invention

The invention relates to a circuit configuration for monitoring a supply voltage of a processor unit being clocked by an oscillator and requiring a minimum supply voltage.

One such circuit configuration has been made by Intersil, for instance, in its ICL 7665 integrated circuit. Details of that circuit can be found, for instance, from the Intersil Component Data Catalog 1986, pp. 5–39 through 5–46. That circuit is essentially a comparator with low power consumption, which is highly advantageous for battery-operated applications. The comparator compares the supply voltage of a processor unit with a reference voltage and if the supply voltage drops below the reference voltage, it puts the microprocessor into a defined reset state. However, in certain operating situations the processor unit can enter into undefined states that lead to high quadrature-axis components of current. That unnecessarily discharges the battery and threatens the processor unit. One such problematic operating situation is, for instance, where an attempt is made to activate the processor unit, at an overly low supply voltage. Activating the processor unit at a supply voltage above its minimum supply voltage can also cause problems, if the supply voltage drops back below the minimum supply voltage as a result of the turn-on and the attendant higher power consumption. In battery,operated applications, a change of batteries, in which either charged or uncharged batteries are installed, can cause such undefined states as well. Finally, impermissible operating situations also occur if the supply voltage rises above the minimum supply voltage before the processor unit is operating properly, during the startup phase of the oscillator.

Summary of the Invention

It is accordingly an object of the invention to provide a circuit configuration for monitoring the supply voltage of an oscillator-clocked processor unit, which overcomes the hereinafore-mentioned disadvantages of the heretofore-known devices of this general type, which requires a minimum supply voltage and in which the aforementioned operating situations do not lead to impermissible operating states.

With the foregoing and other objects in view there is provided, in accordance with the invention, in a circuit having an oscillator and a processor unit being connected to the oscillator, being clocked by the oscillator, receiving a supply voltage and requiring a minimum supply voltage, a circuit configuration for monitoring the supply voltage, comprising an undervoltage detector being connected to the processor unit, the undervoltage detector being in operation and generating a reset signal at a supply voltage being in a range between a lower first limit value and a higher second limit value and being below the minimum supply voltage; and a comparator being connected to the processor unit, the comparator being in operation at a supply voltage above the second limit value and the comparator generating an activation signal at a supply voltage above a third limit value being above the minimum supply voltage; the oscillator being in operation at a supply voltage above the second limit value; and the processor unit being in operation upon the appearance of the activation signal.

Besides having high operating reliability, the circuit configuration of the invention is distinguished above all by low power consumption, which is especially advantageous for battery-operated applications. Moreover, because of the high operating reliability, it is possible to supply power directly from a battery without the interposition of a voltage regulator.

In accordance with another feature of the invention, at a supply voltage above the second limit value, the comparator is in operation only if an additional enable signal appears.

In accordance with a further feature of the invention, there is provided a first memory element being resettable by the undervoltage detector and assuming the output state of the comparator if an externally supplied startup signal appears, and an OR gate forming the enable signal from the startup signal and the applicable output state of the first memory element.

In accordance with an added feature of the invention, the oscillator has a switching input being preceded by a second memory element being resettable by the undervoltage detector and being settable by the set, first memory element, and the oscillator being turned on in the set state of the second memory element.

In accordance with an additional feature of the invention, the first and/or second memory element is additionally resettable by an externally supplied reset signal.

In accordance with yet another feature of the invention, upon the appearance of the reset signal and/or the externally delivered reset signal, all of the terminals of the processor unit are switched into a defined state, for instance a high-impedance state.

In accordance with yet a further feature of the invention, the processor unit has access to the contents of the first and/or second memory element.

In accordance with yet an added feature of the invention, the processor unit is connected to an analog/digital converter, by means of which it monitors the supply voltage at values above the minimum supply voltage, and at a supply voltage above a fourth limit value, which is greater than or equal to the third limit value, it resets the first memory element, sets the second memory element, and upon an ensuing drop in the supply voltage below the fourth limit value, sets the first memory element again.

In accordance with a concomitant feature of the invention, there are provided means for generating the external reset signal if the oscillator is switched off continuously, and for decreasing the external reset signal in a delayed fashion after turn-on of the oscillator.

Other features which are considered as characteristic for the invention are set forth in the appended claims.

Although the invention is illustrated and described herein as embodied in a circuit configuration for monitoring the supply voltage of a processor unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The figure of the drawing is a schematic and block circuit diagram of a configuration for monitoring a supply voltage of a processor unit.

DESCRIPTION OF THE PREFERRED EMBODIMENTS

Referring now to the single figure of the drawing in detail, there is seen a circuit configuration which is shown as an exemplary embodiment, having a processor unit 1 that requires a certain minimum supply voltage for proper operation. The processor unit 1 is supplied with a supply voltage Vs which, for example, is generated by batteries that are not identified by a reference numeral, and can range between zero and a maximum value. The processor unit 1 is also clocked by an oscillator 2, which in turn has a switching input through which it can be turned on or off. According to the invention, an undervoltage detector 3 is provided, which operates at a supply voltage Vs in a range between a first limit value and a second limit value that is above it but below a minimum supply voltage of the processor unit 1, and which continuously generates a reset signal during operation. The first limit value is chosen to be as low as possible and its lower limit is determined primarily by diode thresholds and cutoff voltages of transistors used in the undervoltage detector 3. At a supply voltage Vs above the second limit value, the undervoltage detector 3 is put out of operation again. This can be done, for instance, by blocking suitably wired transistors above the second limit value, thus interrupting the power supply to the undervoltage detector 3. During operation of the undervoltage detector 3, this element outputs a reset signal Rs which, by way of example, is formed by a voltage level corresponding to the logic state 1.

The illustrated circuit configuration also includes a comparator 4, which operates at a supply voltage above the second limit value. This is achieved, for instance, by turning on the comparator if the reset signal Rs is absent. Two cases can be distinguished, namely that the supply voltage Vs is below the first limit value or above the second limit value. Since the one case involves very low supply voltages, comparator operation is not possible anyway. In the other case, the comparator 4 can be turned on by the inverted reset signal Rs. The comparator 4 monitors the supply voltage Vs, and at a value above a third limit value, which is above the minimum supply voltage, it outputs an activation signal As. The oscillator 2 is turned on together with the comparator 4 in the same way in the absence of the reset signal Rs. Conversely, the processor unit 1 is not activated until the activation signal As appears.

A further feature of the invention provides that the comparator is turned on, at a supply voltage Vs above the second limit value, only whenever an additional enable signal Fs appears. To that end, the enable signal Fs is linked with the reset signal Rs that is inverted by an inverter 5, by means of an AND gate 6 and is delivered to a switching input of the comparator 4. The enable signal Fs in turn is a product of a linkage of a startup signal Ss and an output signal of a memory element 7. An OR gate 8 is provided to link the two signals. The memory element 7 is a clocked D-flip-flop with a resetting input. A data input D is connected to the output of the comparator 4, and a clock input Cl is acted upon by the startup signal Ss. A resetting input R is also connected to an output of an OR gate 9. The OR gate 9 links the reset signal Rs at the output of the undervoltage detector 3 to an externally supplied reset signal Er.

A further memory element 10 precedes the switching element of the oscillator 2. The memory element 10 is an RS flip-flop, having a resetting input R which is connected to the output of the OR gate 9 and having a setting input S which is connected to the output of the memory element 7. The oscillator 2 is turned on in the set state of the memory element 10 and it is turned off in the reset state.

Finally, two further memory elements 11 and 12 are provided, namely two RS flip-flops. The setting input S of the memory element 11 is connected to the output of the comparator 4, and the resetting input R is connected to the output of an OR gate 13. The OR gate 13 is coupled both to the output of the OR gate 9 and to the output of the comparator 4, with the interposition of an inverter 14. In the memory element 12, the setting input S is connected directly and the resetting input R is connected with the interposition of an inverter 15, to the output of the OR gate 9. The outputs of the memory elements 11 and 12 are coupled to the processor unit 1. When the memory element 11 is set, this signals the processor unit 1 that the supply voltage Vs is adequate and that the processor unit 1 can begin operation. In the reset state of the memory element 12, all of the terminals of the processor unit 1 that lead to the outside are switched to a high-impedance state, in order to avoid uncontrolled quadrature-axis components of current between individual terminals. The high-impedance state at the terminals can be compared with the corresponding state in tristate outputs. Finally, the processor unit 1 has access selectively, for instance through a bus 16, to the memory elements 7, 10, 11, 12. The processor unit 1 can thus set or reset the various memory elements and read out their contents under program control.

According to a further feature of the invention, the processor unit 1 is also connected to an analog/digital converter 17, by means of which the supply voltage VS is monitored. Under program control, at a supply voltage VS above a fourth limit value, which is greater than or equal to the third limit value, the processor unit 1 resets the memory element 7, sets the memory element 11, and sets the memory element 7 again upon an ensuing drop in the supply voltage Vs below the fourth limit value.

All of the memory elements 7, 10, 11, 12 are edge-triggered flip-flops which, however, can easily be replaced by static flip-flops, given a suitable configuration of the respective trigger signal.

As soon as the supply voltage Vs exceeds the first limit value, the undervoltage detector 3 is activated, which generates the reset signal Rs. This reset signal Rs puts all of the memory elements 7, 10, 11, 12 into the reset state. When the memory element 12 is reset, all of the terminals are switched into a defined state, for instance at a high-impedance. When the memory element 10 is reset, the oscillator 2 is turned off. The reset memory element 11 signals the processor unit 1 that the supply voltage is in a non-permissible range, namely below the requisite minimum supply voltage. Finally, the reset memory element 7 prevents the activation of the comparator 4. Accordingly, the processor unit 1 is put into a defined state at the earliest possible moment, namely when the first limit value is reached, so that the current consumption is minimal.

The undervoltage detector 3 is operative from the first limit value on and is turned off when the second limit value is reached. The comparator 4 is thereupon activated, which is substantially more accurate than undervoltage detection. However, the more-accurate limit value detection requires a higher current, because there is essentially a direct connection between accuracy and power consumption. In order to minimize power consumption of the overall configuration, the comparator 4 is therefore not turned on until an attempt is made to activate the processor unit 1. The activation of the processor unit 1 is indicated by the signal Ss, which is derived, for instance, from the actuation of a key. The signalling as to whether or not the third limit value has been exceeded, or in other words that the supply voltage Vs is in the permissible or impermissible range, is done by setting the memory element 11. The set state of the memory element 11, as well as of all of the other memory elements 7, 10, 12, can be read as a so-called flag by the processor unit 1. If the supply voltage Vs is in the permissible range, then the flag is set and thus indicates to the processor unit 1 that this unit can begin operation. If the supply voltage Vs is in the permissible range and if the startup signal Ss is generated simultaneously, then the memory element 7 is set as well. With the setting of the memory element 7, the memory element 10 in turn is set, which allows the oscillator 2 to begin operation and continuously activates the comparator 4. If the startup of the overall configuration, and the attendant greater power consumption, causes the supply voltage Vs to drop back below the third limit value, the memory element 11 is reset again by the comparator 4. By interrogating this flag, the processor unit 1 can then determine that the supply voltage Vs is in the impermissible range and can initiate a defined turn-off. However, if the processor unit 1 remains activated, the analog/digital converter 17 can subsequently be used to monitor the supply voltage Vs. In order to minimize power consumption, the comparator 4 can therefore be turned off again under program control by the processor unit 1, since the comparator resets the memory element 7. In that case, however, the memory element 11 is reset as well, which then is either ignored, or set, by the processor unit 1. If the supply voltage drops below the fourth limit value, then the comparator 4 is put into operation again by the processor unit 1 by setting of the memory element 7, and the supply voltage monitoring is again performed by the comparator 4, or in the case of a low supply voltage Vs, by the undervoltage detector 3.

In order to provide additional security in the impermissible supply voltage range, and to assure a defined startup of the processor unit 1, an additional reset cell is provided. This reset cell essentially respectively includes one p-channel and one n-channel field effect transistor 18 and 19. If the oscillator 2 is turned off, that is if the memory element 12 is reset, the transistor 19 is made conducting, and as a result an external resetting input Es is again activated, so that the external reset signal Er is generated continuously as a result of the turned-off oscillator 2. If the oscillator 2 is put into operation, then the transistor 19 blocks and the transistor 18 opens, so that a capacitor 20, and therefore the potential at the resetting input Es, rises with a predetermined time constant up to the value of the supply voltage Vs. As a result, the external reset signal Er is not decreased until after the oscillator 2 has had a certain amount of time available for transient recovery.

We claim:

1. In a circuit having an oscillator and a processor unit being connected to the oscillator, being clocked by the oscillator, receiving a supply voltage and requiring a minimum supply voltage, a circuit configuration for monitoring the supply voltage, comprising:

an undervoltage detector connected to the processor unit, said undervoltage detector being in operation and generating a reset signal when a supply voltage is in a range between a lower first limit value and a higher second limit value below the minimum supply voltage; and a comparator connected to the processor unit, said comparator being in operation at a supply voltage above the second limit value and if an additional enable signal appears, said comparator comparing the supply voltage with a third limit value above the minimum supply voltage and generating an activation signal when the supply voltage lies above the third limit value;

the oscillator being in operation at a supply voltage above the second limit value; and the processor unit being in operation upon the appearance of the activation signal.

2. The circuit configuration according to claim 1, including a memory element being resettable by said undervoltage detector and storing an output state of said comparator if an externally delivered startup signal appears, and an OR gate receiving the startup signal and an output of said memory element and forming the enable signal.

3. The circuit configuration according to claim 2, wherein the oscillator has a switching input, said memory element is a first memory element, and including a second memory element being connected upstream of the switching input of the oscillator, being resettable by said undervoltage detector and being settable by said first, set, memory element, and the oscillator being turned on in the set state of said second memory element.

4. The circuit configuration according to claim 3, wherein at least one of said memory elements can additionally be reset by an externally supplied reset signal.

5. The circuit configuration according to claim 4, wherein the processor unit has terminals all being switched into a defined state, upon an appearance of at least one of the reset signals.

6. The circuit configuration according to claim 3, wherein the processor unit has access to the contents of at least one of said memory elements.

7. The circuit configuration according to claim 6, wherein the processor unit has an analog/digital converter for monitoring the supply voltage at a supply voltage above the minimum supply voltage, and at a supply voltage above a fourth limit value being at least as great as the third limit value, the processor unit resets said first memory element, sets said second memory element, and sets said first memory element again upon an ensuing drop in the supply voltage below the fourth limit value.

8. The circuit configuration according to claim 2, wherein said memory element can additionally be reset by an externally supplied reset signal.

9. The circuit configuration according to claim 8, wherein the processor unit has terminals all being switched into a defined state, upon an appearance of at least one of the reset signals.

10. The circuit configuration according to claim 2, wherein the processor unit has access to the contents of said memory element.

11. In a circuit having an oscillator and a processor unit being connected to the oscillator, being clocked by the oscillator, receiving a supply voltage and requiring a minimum supply voltage, a circuit configuration for monitoring the supply voltage, comprising:

an undervoltage detector connected to the processor unit, said undervoltage detector being in operation and generating a reset signal when a supply voltage is in a range between a lower first limit value and a higher second limit value below the minimum supply voltage; and a comparator connected to the processor unit, said comparator being in operation at a supply voltage above the second limit value, said comparator comparing the supply voltage with a third limit value above the minimum supply voltage and generating an activation signal when the supply voltage lies above the third limit value;

the oscillator being in operation at a supply voltage above the second limit value;

the processor unit being in operation upon the appearance of the activation signal; and means for generating an external reset signal if the oscillator is switched off continuously, and for switching off the external reset signal after a delay following turn-on of the oscillator.

* * * * *